(12) United States Patent
Ainsworth et al.

(10) Patent No.: US 6,535,404 B2
(45) Date of Patent: Mar. 18, 2003

(54) CONTROLLING OPERATION OF AN AC/DC CONVERTER

(75) Inventors: John Desmond Ainsworth, Croxton (GB); Lorenzo Bottacchiari, München (DE); Robert Stephen Whitehouse, Wildwood (GB)

(73) Assignee: Alstom, Paris (FR)

( * ) Notice: Subject to any disclaimer, the term of this patent is extended or adjusted under 35 U.S.C. 154(b) by 38 days.

(21) Appl. No.: 09/832,284

(22) Filed: Apr. 10, 2001

(65) Prior Publication Data

US 2002/0145890 A1 Oct. 10, 2002

(30) Foreign Application Priority Data

Apr. 13, 2000 (GB) .............................................. 0008994

(51) Int. Cl.⁷ ................................................ H02M 1/12
(52) U.S. Cl. .............................. 363/44; 363/87; 363/129
(58) Field of Search ................................ 363/34–37, 44, 363/78, 79, 85, 128, 87, 129, 39; 323/205, 207; 307/105; 318/629

(56) References Cited

U.S. PATENT DOCUMENTS

| | | | |
|---|---|---|---|
| 4,812,669 A | 3/1989 | Takeda et al. | |
| 5,235,503 A | 8/1993 | Stemmler et al. | |
| 5,347,441 A | 9/1994 | Terada et al. | |
| 5,995,391 A | * 11/1999 | Davies et al. | ............... 323/217 |
| 6,295,216 B1 | * 9/2001 | Faria et al. | ................. 307/105 |
| 6,331,765 B1 | * 12/2001 | Yamamoto et al. | ......... 323/210 |

FOREIGN PATENT DOCUMENTS

| | | |
|---|---|---|
| EP | 0 152 796 A1 | 8/1985 |
| GB | 1 347 548 | 2/1974 |
| GB | 2 229 870 A | 10/1990 |

* cited by examiner

*Primary Examiner*—Robert E. Nappi
*Assistant Examiner*—Gary L. Laxton
(74) *Attorney, Agent, or Firm*—Kirschstein, et al.

(57) ABSTRACT

An AC/DC converter has an auxiliary control system which attenuates or suppresses an unwanted or non-characteristic harmonic component (such as a $3^{rd}$ harmonic component) of voltage in an AC power system caused by operation of the converter. The converter comprises thyristors and is connected via transformer to the AC power system which comprises an AC or Thevenin e.m.f. source, an impedance, and busbars. The auxiliary control system is connected to a main control system of the AC/DC converter providing firing pulses for the converter. Input signal including the unwanted harmonic component in the AC power system, is operated on by the auxiliary control system to provide an output signal which is added to a thyristor firing control signal at a summing point of the main control system so that resultant thyristor firing pulses therefrom modify operation of the converter to attenuate or suppress the non-characteristic harmonic component in the DC output of the converter and thereby attenuate or suppress the harmonic component in the AC power system.

12 Claims, 3 Drawing Sheets

CONTROLLING OPERATION OF AN AC/DC CONVERTER

FIELD OF THE INVENTION

This invention concerns an AC/DC converter provided with a control system which has the facility to control the converter's operation with respect to generation of harmonics in an AC power system to which it is connected.

The converter may be a 6 pulse or 12 pulse type comprising six or twelve thyristors or groups of series-connected thyristors connected via a transformer to 3-phase AC busbars connected to an AC source via a load.

BACKGROUND TO THE INVENTION

Normally at least one harmonic filter is provided in shunt to the busbars primarily to filter out characteristic harmonic currents produced by the converter. For example, for a 12-pulse converter, the harmonic currents may be of the order 11, 13, 23 and 25, etc.

In normal operation, first assuming a perfectly balanced 3-phase AC system, and also perfect balance of internal components in the converter system (such as transformer leakage inductances), the AC side harmonics generated by a 12-pulse converter, for example, will be at multiples of AC system frequency of 11, 13, 23, 25, . . . The DC side harmonics are of orders 12, 24, 36 . . .

In practice such perfect balance cannot be guaranteed, and for example the AC busbar voltages may contain a negative sequence fundamental component, due mostly to unbalance of AC line impedances and unequal loads between the three phases in the AC system. It can be shown that on the DC side of the converter this will cause a 2nd harmonic voltage component to appear. This causes a 2nd harmonic current on the DC side, which in turn modifies the AC currents drawn by the converter from the AC system so that they contain $3^{rd}$ harmonic components. The effect of the latter is to cause $3^{rd}$ harmonic voltages both locally on the converter busbars, and also in remote parts of the AC system. These voltages may have an amplitude of up to typically 3% of rated converter current, and may cause unacceptable interference to other equipment in the AC system.

A well known method to reduce such interference is to provide passive filters tuned to the $3^{rd}$ harmonic on the AC busbars. These can however be of substantial cost, particularly because of the relatively low frequency ($3^{rd}$ harmonic) to be filtered.

OBJECTS OF THE INVENTION

A general object of the invention is to provide a thyristor-type AC/DC converter with an auxiliary control system and method for the attenuation or suppression to zero or low values of a non-characteristic component of voltage or current in an AC system connected to the AC/DC converter, in the presence of an unbalance, without use of filters corresponding to that noncharacteristic component.

One particular object of the invention is to provide such an AC/DC converter with an auxiliary control system, and a method of controlling such a system, which can reduce $3^{rd}$ harmonic currents and voltages in the AC system to zero or low values, in the presence of unbalance, without use of $3^{rd}$ harmonic filters. A further object is to provide such an auxiliary control means which may also be adapted to reduce other low order AC currents, for example harmonic orders 4, 5, 6 or 7, in the case of a twelve-pulse converter.

SUMMARY OF THE INVENTION

According to the invention there is provided a thyristor-type AC/DC converter for connection to an AC power system, the converter having a main control system for supplying firing pulses to a plurality of thyristors in the converter and an auxiliary control system connected to the main control system through a summing junction for modifying the timing of the firing pulses from the main control system, thereby to suppress a non-characteristic $n^{th}$ harmonic component of a fundamental frequency in the AC power system caused by the operation of the AC/DC converter, the auxiliary control system being connected to receive a three-phase input signal representative of the harmonic component and deliver to the summing junction an output signal comprising a modulating $r^{th}$ harmonic signal, the auxiliary control system comprising a two-axis integral AC servo control.

More particularly, the auxiliary control system preferably comprises:

a three-phase to two-phase conversion means for converting the input signal to two signals containing both the fundamental frequency and the $n^{th}$ harmonic component, demodulating means for demodulating the two signals from the conversion means to produce two DC signals proportional respectively to direct axis and quadrature axis components of the $n^{th}$ harmonic component, co-ordinate transform means for phase rotation of the two DC signals from the demodulating means by a phase angle λ, integration means for integration of the phase rotated signals from the signal co-ordinate transform means to produce two integrated DC signal components, and modulating means for modulating and combining the two integrated DC signal components from the signal integration means to form the $r^{th}$ harmonic output signal from the auxiliary control system.

The AC/DC converter may comprise a 6-pulse or 12-pulse converter.

In one preferred embodiment, the non-characteristic $n^{th}$ harmonic is the $3^{rd}$ harmonic and the modulating $r^{th}$ harmonic is the $2^{nd}$ harmonic.

The auxiliary control system may have gain and phase angle settings which are manually adjustable.

Alternatively, the auxiliary control system may have gain and phase angle settings which may be adjusted in dependence on measured quantities in the converter according to predetermined relationships. The measured quantities may comprise converter DC voltage and converter DC current.

The auxiliary control system may have gain and phase angle settings which are adjusted by a self-adaptive control system based on an automatic two-stage test method carried out with the auxiliary control system in an open-loop mode to modify the gain and phase settings to optimum values. If desired, the gain and phase angle settings of the auxiliary control system may be set to values substantially equal to the reciprocal of a measured complex value of total loop gain of a network comprising the main control system, AC/DC converter, AC system and at least part of the auxiliary control system. The test and modification of the gain and phase settings may be repeated on detection of substantial disturbances in operation of the AC/DC converter.

The auxiliary control system may have a phase angle setting which may be adjusted by a self-adaptive control system based on a single-stage test carried out with the auxiliary control system in a closed-loop control mode by a comparison of phases of the input and output signals of the auxiliary control system and subsequent automatic transfer of an angle derived from such comparison to become a working angle of the auxiliary control system. The phase comparison and angle transfer may be initiated at first switch-on of the auxiliary control system and/or on detection of substantial disturbances in operation of the AC/DC converter.

BRIEF DESCRIPTION OF THE DRAWINGS

The invention will now be further described, by way of example, with reference to the accompanying drawings in which.

DETAILED DESCRIPTION OF THE PREFERRED EMBODIMENT

In the following description like references identify like components, operations or phenomena.

Figure 1:
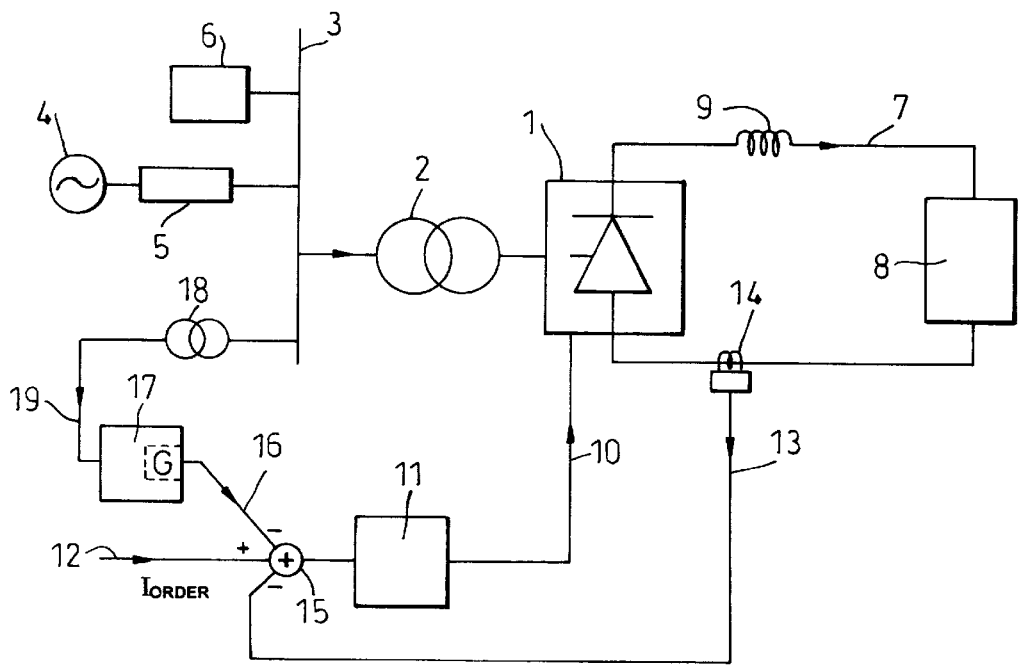
FIG. 1 shows an arrangement of an electrical circuit comprising an AC power system, an AC/DC converter with a main control system for the converter, and an auxiliary control system formed according to the invention.

With reference to FIG. 1 an AC/DC converter arrangement is shown in single-line diagrammatic form. A converter 1 itself may be a 6-pulse or 12-pulse type, including respectively 6 or 12 thyristors or groups of series-connected thyristors, connected via a transformer 2 to 3-phase AC busbars 3. The 3-phase AC system per phase is shown as a Thevenin source e.m.f. 4 behind an impedance 5. A harmonic filter 6 is shown connected in shunt to the AC busbars 3, principally to filter characteristic harmonic currents produced by the converter (for example, orders 11, 13, 23, 25, . . . for a 12-pulse converter).

On the DC side the converter 1 supplies DC current 7 to a load 8 via an optional DC smoothing inductor 9. The load is not shown in detail but may be an industrial load such as an electric motor, or another AC/DC converter connected to a second AC system; for the latter case, the DC system may be direct to the second converter (with or without a DC inductor 9), i.e., a "back-to-back" scheme, or may include an overhead DC line and/or a DC cable.

The arrangement mentioned above with two converters is commonly used in high voltage DC (HVDC) power applications where the power rating may typically be from 100 MW to 1000 MW or more, the DC voltage may typically be from 100 kV to 500 kV or more, and the AC voltages may be up to 400 kV or more.

The thyristors in converter 1 are controlled by fining pulses 10 supplied by a main control system 11. The latter is not shown in detail but may be of a known type, for example, a phase-locked oscillator control system. This will normally be connected via a closed-loop control system.

As an example, the control system 11 is shown as a DC current control system in which a current order signal 12 and a signal 13 proportional to measured converter DC current (obtained via a DC current transformer 14) are connected via a summing junction 15. The latter is shown as having a third input 16 from an auxiliary control system 17.

In brief, the invention concerns the use of the auxiliary control system 17 to attenuate or suppress a non-characteristic harmonic component of voltage or current in the AC power system caused by the operation of the AC/DC converter 1 when connected to the AC power system. The auxiliary control system 17 is connected to the main control system 11 of the AC/DC converter via the summing junction 15 and operates on an input signal 19 derived from a measured value of the non-characteristic harmonic component to provide an output signal 16 which is added to the summing junction to reduce the amplitude of the non-characteristic harmonic component to zero or a small value.

The auxiliary control system 17 operates as a "two-axis" integral AC servo control and is in the form of demodulator/integrators/modulator.

In detail, main feedback signals for the auxiliary control system 17 are shown in FIG. 1 as being from the main AC busbars 3 via a 3-phase voltage transformer 18 supplying voltages 19. These signals are 3-phase, and in general will contain the normal large fundamental frequency voltages, small amounts of "characteristic harmonics" of order 11 upwards (assuming a 12-pulse converter 1) plus unwanted $3^{rd}$ harmonic voltages. The $3^{rd}$ harmonic components are the signal feedback quantities for the auxiliary control 17, and the fundamental voltage components are used for reference signal generation at $2^{nd}$ and $3^{rd}$ harmonics as described below.

Figure 2:
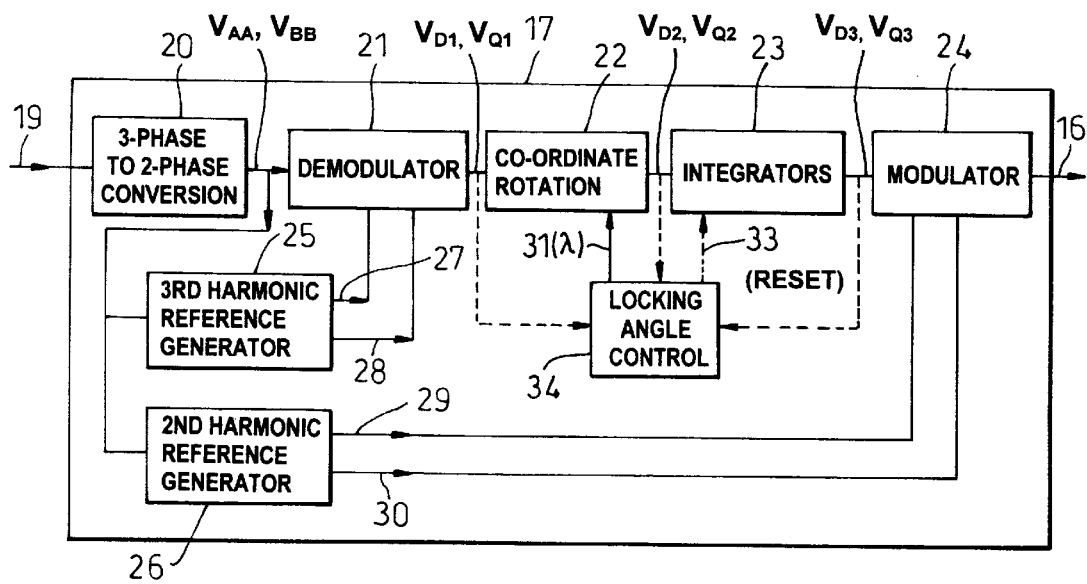
FIG. 2 is a diagram representing the auxiliary control system in FIG. 1.

The main signal function blocks in the auxiliary control 17 as shown in FIG. 2 are:

3-phase to 2-phase conversion 20;
demodulator 21;
co-ordinate rotation 22;
integrators 23;
modulator 24;
$3^{rd}$ harmonic reference generator 25;
2nd harmonic reference generator 26; and
locking angle λ control 34; this latter functional block is shown with some inputs and outputs in dashed lines, since as explained below, they are not required in all embodiments of the invention.

Figure 3:
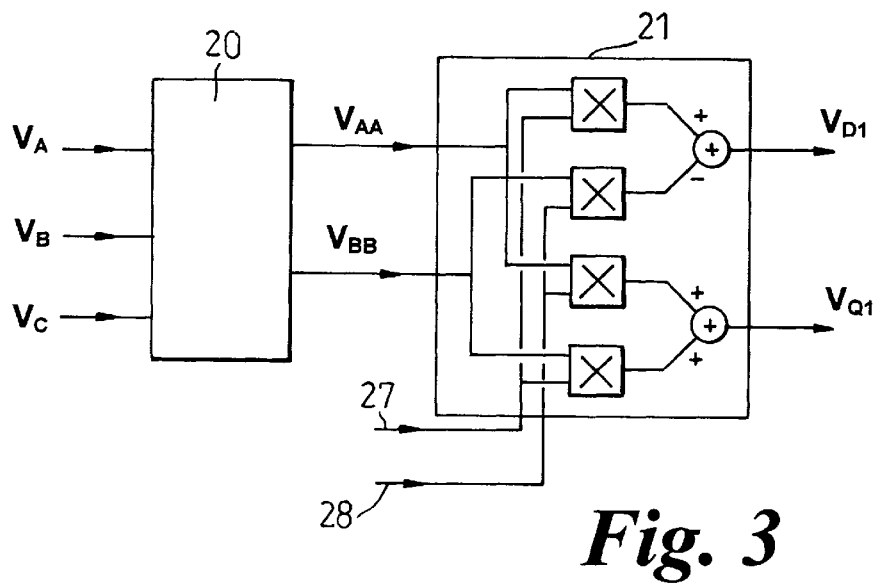
FIG. 3 is a diagram representing a 3-phase/2-phase conversion and a demodulator in the auxiliary control system in FIG. 2.

FIG. 3 shows the 3-phase to 2-phase conversion block 20, delivering two output signals $V_{AA}$ and $V_{BB}$ containing both fundamental and $3^{rd}$ harmonic, each in phase quadrature. This block 20 is not shown in detail but contains only adders and gain fimctions, solving the well-known 3-phase to 2-phase transformation.

The reason for conversion 20 is to simplify following blocks from three channels to two channels each.

FIG. 3 also shows the demodulator block 21, containing four multipliers and two summing junctions. Two outputs from demodulator 21 are DC signals $V_{D1}$ and $V_{Q1}$ proportional respectively to the "d-axis" and "q-axis" components of $3^{rd}$ harmonic in the AC busbar voltages, as normally defined in two-axis theory. These signals also contain spurious AC components, mostly at $2^{nd}$ and 4th harmonics. As also shown in FIG. 2, the demodulator 21 requires reference signals 27, 28 in quadrature, at the $3^{rd}$ harmonic of AC system frequency. These are generated in known manner by the $3^{rd}$ harmonic reference generator 25, using an input from signals $V_{AA}$, $V_{BB}$ output by the 3-phase to 2-phase converter 20. The aforesaid d-axis is the direct axis and the q-axis is the quadrature axis.

The two voltages $V_{D1}$ and $V_{Q1}$ are applied via a co-ordinate rotation block 22 (FIG. 4), discussed later, to two integrators in the integrators block 23 shown in FIG. 5. The DC components of integrator outputs are defined as $V_{D3}$ and $V_{Q3}$. The latter are applied to modulator block 24, which contains two multipliers and a summing junction. As also shown in FIG. 2, this requires two reference signals 29, 30 in quadrature at 2nd harmonic of AC system frequency. These are generated in known manner by the $2^{nd}$ harmonic reference generator 26, using an input from signals $V_{AA}$, $V_{BB}$ output by the 3-phase to 2-phase converter 20. A final output 16 of the auxiliary control 17 is then a single AC signal at 2nd harmonic, applied to the summing junction 15 in the main control loop of the control system 11.

Means for generating sinusoidal reference waveforms at $2^{nd}$ and $3^{rd}$ harmonics are not described in detail but may be based on known methods, such as phase-locked oscillators locked to fundamental AC system frequency and generating the appropriate multiple of this. Two signals in quadrature phase are required from each of the $2^{nd}$ and $3^{rd}$ harmonic reference generators.

In operation, assuming a suitable relative phase rotation in rotation block 22, it is found that the presence of negative-sequence unbalance of the AC system voltages causes a $3^{rd}$ harmonic in converter 1 currents, hence $3^{rd}$ harmonic voltages at the AC busbars 3. The demodulator 21 temporarily produces finite DC voltages at its two outputs, which cause the two outputs from integrators 23 to change. These are then converted to 2nd harmonic signals at the output of each multiplier in the modulator 24 which combine to form a single 2nd harmonic signal at the demodulator output, delivered as the final modulation signal 16 added to the summing junction 15 of the main control 11 loop.

If the phase and gain of the final modulator signal 16 are suitable, the effect is to change the main converter 1 firing time pattern such as to reduce the $3^{rd}$ harmonic current, and hence voltage, on the main AC busbars 3 towards zero on all three phases. The system then settles ideally to a steady state in which the mean inputs to the integrators 23 are zero, and their outputs are finite, at the values to achieve the appropriate final 2nd harmonic modulation required.

Locking Angle and Gain Adjustment

In practice there are phase shifts in various places, notably in the main converter 1 and in its main control system 11, and in the impedance seen by the converter at the AC busbars 3 (AC system impedance 5 and main AC filters 6). The effect of these may vary in dependence on the particular working conditions of the converter 1 (for example, mean firing angle, power level, and DC load impedance) and the impedance of the AC system.

There is always an optimum phase of the auxiliary control 17 output 16 which gives best stability and fastest settling time of $3^{rd}$ harmonic voltages. If the auxiliary control 17 phase differs slightly from this, its performance deteriorates (giving slower settling) and if the phase differs by more than ±90° from optimum, the auxiliary control system becomes unstable.

Figure 4:
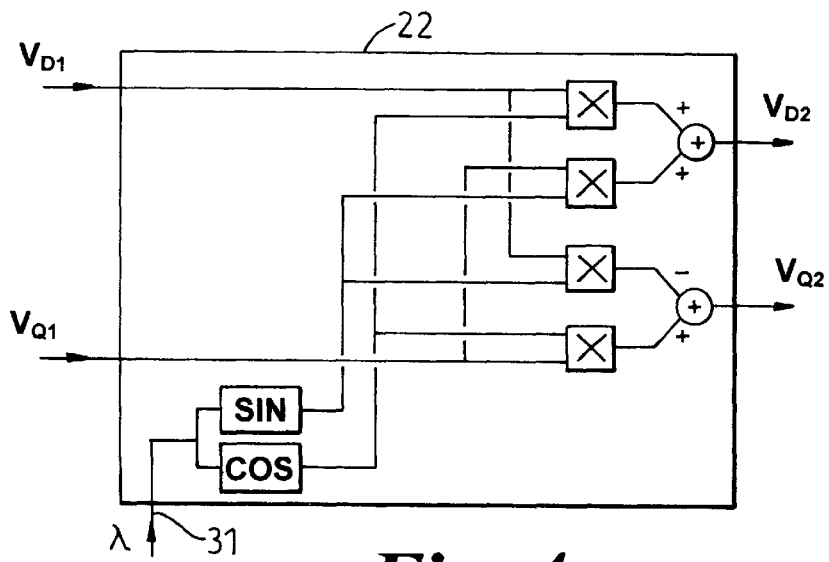
FIG. 4 is a diagram representing a co-ordinate rotation in the auxiliary control system in FIG. 2.
Figure 5:
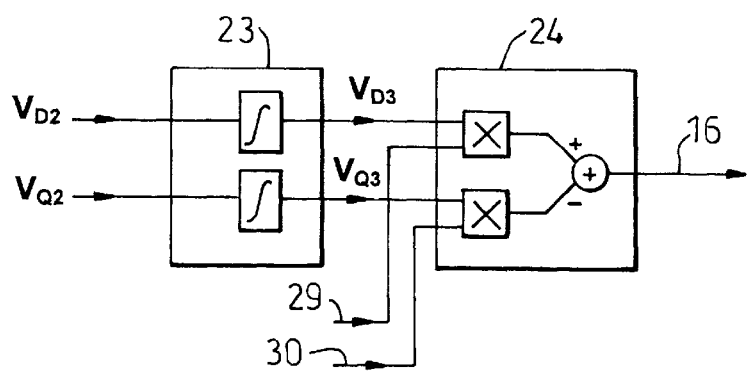
FIG. 5 is a diagram representing integrators and a demodulator in the auxiliary control system in FIG. 2.

The co-ordinate transformation or rotation block 22 provides a reference frame angle change effect by the known method shown in FIG. 4. This has a "locking angle" input λ which supplies sine and cosine blocks (FIG. 4). Together with the multipliers and adders as shown in FIG. 4 this causes the equivalent of an angle rotation by λ in the final auxiliary control output signal 16 by solving the equations:

$$V_{D2}=V_{D1}\cos\lambda + V_{Q1}\sin\lambda,$$

and $$V_{Q2}=-V_{D1}\sin\lambda + V_{Q1}\cos\lambda.$$

By adjustment of the signal λ (31) between zero and 360° an optimum or near-optimum angle can be found, giving stable settling of the auxiliary control system 17. This will be defined as the locking angle.

The loop gain of the auxiliary control system 17 may be adjusted by introducing an adjustable gain device G (FIG. 1) at any convenient point in the auxiliary control system, for example, at the output 16. As in any closed-loop control system, there is an optimum gain giving a compromise between too slow a response if gain is low, and instability if gain is high.

A first method of setting the locking angle λ and control gain may be fixed manual settings of these through a manually adjustable gain device G and locking angle control 34 (FIG. 2). This may be suitable where the operating conditions of the main converter are relatively constant.

For a moderate range of operating conditions a second method is to arrange locking angle and gain to be automatically varied by an open-loop control arrangement (not shown) in dependence on the principal system variables, such as main converter DC current and DC voltage using pre-determined relative proportions of signals from these as DC quantities to vary the locking angle and gain.

Self-Adaptive Locking Angle Control

A third method of adjusting locking angle and gain may be by an adaptive gain/phase control based on an automatic open-loop test of the main power system by injection of a test signal, generally as described in connection with control of 2nd and 12th harmonic cross-modulation between two coupled converters, in our co-pending European patent application number EP01301295.0 filed on Feb. 13, 2001 (see the passage between line 29 on page 12 and line 14 on page 16 of the specification filed with that application). Thus, auxiliary control system 17 may have gain and phase angle settings which are adjusted by a self-adaptive control system based on an automatic two-stage test method carried out with the auxiliary control system in an open-loop mode to modify the gain and phase settings to optimum values. The gain and phase settings can be set to values substantially equal to the reciprocal of a measured complex value of total loop gain of a network comprising the main control system 11, AC/DC converter 1, the AC system 3, 4, 5, 6, and at least part of the auxiliary control 17.

Alternative Method of Self-Adaptive Locking Angle Control

A fourth method of adjusting locking angle λ is, as indicated in FIG. 2 by the dashed lines, by utilizing certain measurements carried out on the auxiliary control system 17 while in normal closed-loop operation.

Figure 6:
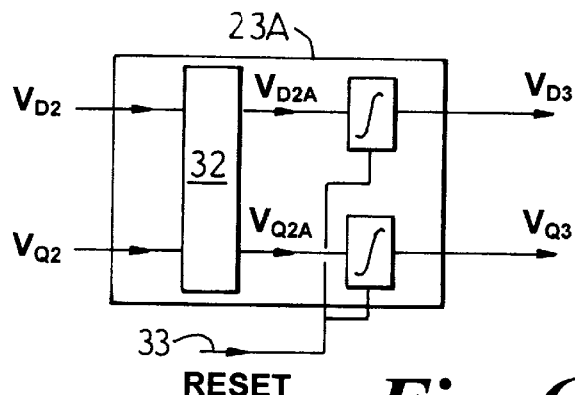
FIG. 6 is a diagram representing integrators as a modification of the integrators in FIG. 5.

For this the auxiliary control system 17 is modified as follows:

a) The integrators block 23 (FIGS. 2 and 5) is substituted by a modified integrators block 23A (FIG. 6) modified by the addition of a reset signal 33 to the integrators, and the addition of limiter block 32.

b) Its input signals $V_{D2}$, $V_{Q2}$ are used to calculate a magnitude $V_2$ of these, considered as equivalent two-axis phasor components by the expression:

$$V_2 = \sqrt{V_{D2}^2 + V_{Q2}^2}$$

This is a DC value, proportional to the magnitude of the $3^{rd}$ harmonic voltage on the AC busbars 3.

c) $V_2$ is applied to a comparator with a fixed small reference $V_{max}$ of, for example, 1% referred to equivalent $3^{rd}$ harmonic voltage at the AC busbars 3, relative to rated AC system voltage.

d) If $V_2$ is greater than this setting, the voltages $V_{D2}$, $V_{Q2}$ are connected directly to the respective integrators inputs, and overall operation is as a normal closed-loop control, which should ideally tend to reduce $3^{rd}$ harmonic voltages, and hence $V_2$.

e) If $V_2$ is less than $V_{max}$ the integrator inputs are disconnected from $V_{D1}$, $V_{Q1}$ and set to zero, leaving the integrator outputs $V_{D3}$, $V_{Q3}$ frozen at their last values.

The effect is to provide finite minimum values of $V_{D1}$, $V_{Q1}$ in closed-loop steady state operation such that their equivalent angle is measurable as described later. With suitable choice of the locking angle setting, the $3^{rd}$ harmonic voltage on the AC busbars 3 can then be acceptably low, but not necessarily zero.

Locking Angle Control

Figure 7:
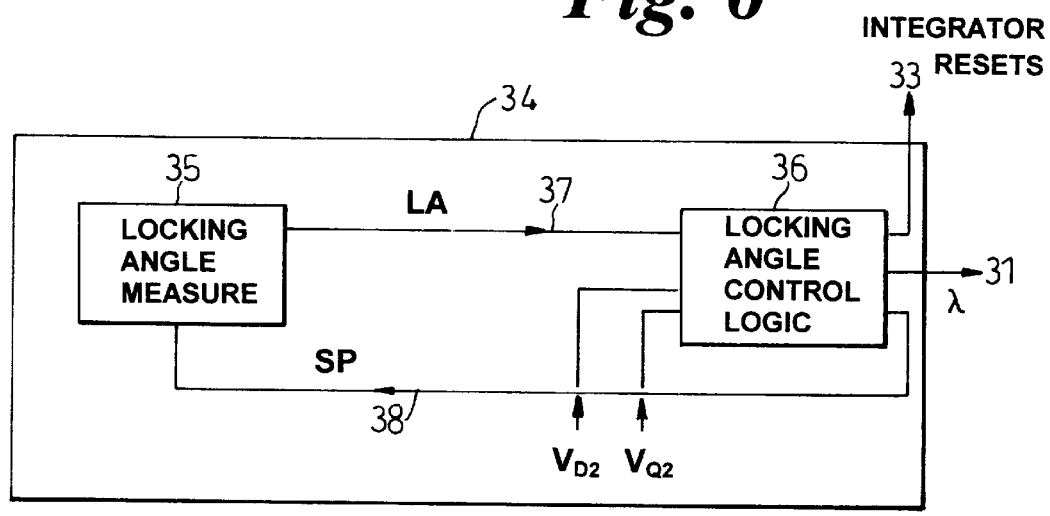
FIG. 7 is a diagram representing a locking angle control for use in conjunction with the integrators in FIG. 6.

A locking angle control block 34 is added as shown in FIGS. 2 and 7. This contains two sub-blocks which are locking angle measure 35, and locking angle control logic 36.

Locking Angle Measure 35

Figure 8:
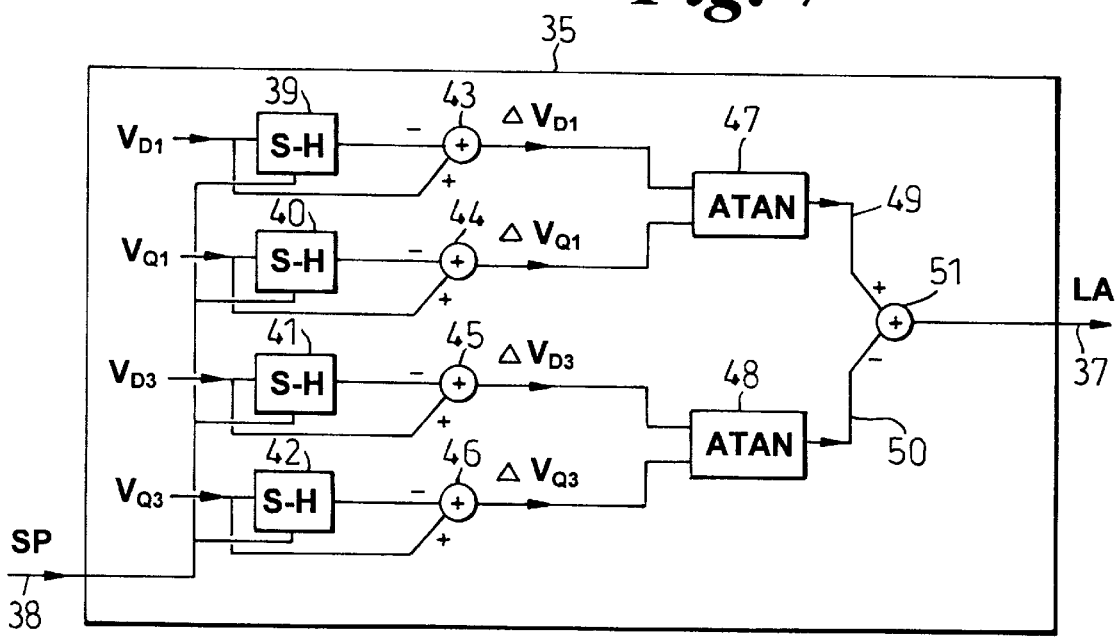
FIG. 8 is a diagram representing locking angle measure in FIG. 7.

Details of the locking angle measure block 35 are shown in FIG. 8. Inputs to this are DC voltages $V_{D1}$, $V_{Q1}$ at the demodulator 21 output (FIG. 3), representing a two axis measurement of $3^{rd}$ harmonic on the AC system, and DC voltages $V_{D3}$, $V_{Q3}$ at the input to the modulator 24, representing the 2-axis values of the modulation signal 16 to the main DC converter control 11.

These four signals are each applied to sample-and-hold circuits 39, 40, 41 and 42 and thence to summing junctions 43, 44, 45 and 46. The summing junctions 43, 44, 45, 46 each have also an input (of opposite sign) from the signal values before the sample-and-hold circuits 39, 40, 41, 42, so that their outputs correspond to the change of their respective inputs from the last time of operation of a sampling pulse 38 applied to all the sample-and-hold circuits.

Outputs defined as $\Delta V_{D1}$, $\Delta V_{Q1}$ as shown in FIG. 8 are applied to an arctangent circuit 47, which gives an output 49 representing the phase angle of the equivalent phasor ($\Delta V_{D1} + j\Delta V_{Q1}$). A similar arrangement for outputs $\Delta V_{D3}$, $\Delta V_{Q3}$ is provided via arctangent block 48 giving phase angle 50.

Summing junction 51 provides the difference of the two angle signals 49, 50 as signal 37, defined as LA.

Locking Angle Control Logic 36

Block 36 contains the locking angle control logic which may be formed by any known means, for example digital microprocessor equipment.

When the main converter 1 is de-blocked, or its AC supply is switched on, a short time (for example 0.5 seconds) is allowed for it to settle to steady state. The integrators (FIG. 6) are held at zero output up to this time. A short sampling pulse SP (38) is then issued which causes the sample-and-hold circuits 39, 40, 41, 42 in block 35 to store the values of $V_{D1}$, $V_{Q1}$, $V_{D3}$, $V_{Q3}$ at this time. (The values of $V_{D3}$, $V_{Q3}$ in FIG. 6 will be zero for this case, i.e., at switch-on, because these are the integrator outputs). An arbitrary angle of $\lambda = \lambda_0$ is set initially in the main control path, via block 22. The auxiliary control 17 is then switched on by releasing its integrators, previously held at zero output.

The integrator outputs (FIG. 6) will then in general start to change, producing a finite 2nd harmonic output 16. The angle measuring block 35 will produce an output angle signal LA which will in general be changing. At this stage the control system 11 may be stable or unstable. However in the early stages of this process, the measured angle LA will in either case tend to a relatively steady value. This is detected by measurement of its rate of change over a defined time. When this is low enough, the value of LA will be close to the optimum locking angle for the system. It is then stored and the working control angle $\lambda$ switched to this value.

The system will then in general start to settle towards a stable condition, with low $3^{rd}$ harmonic voltage on the AC busbars 3. When this falls below the value corresponding to $V_{max}$ the integrators (FIG. 6) will "freeze" as explained above, and the system remains stable in this condition.

For any later disturbance, such as temporary loss of AC or DC system voltage or a sudden or gradual change in the main converter 1 power, this may be detected either by relays measuring main AC or DC voltage or power or by detecting a value of $V_3$ in excess of $V_{max}$ for more than a set time. A re-start of the auxiliary control system 17 may then be initiated as above but using the previously set locking angle X as the starting angle.

This fourth method of adjusting $\lambda$ is potentially capable of faster settling than the 3rd method, except where control system 11 has to be provided with filters having long settling times.

No filters inside the auxiliary control system 17 are described above, but those skilled in control art will realize that these may be necessary in various places, to prevent spurious signals from disturbing the operation. This will be particularly true of the demodulator 21 output, where large signals at 2nd and 4th harmonics will exist, caused by the large fundamental frequency signals entering the demodulator.

Although only described above for attenuating the $3^{rd}$ harmonic, the invention may be applied also to other unwanted harmonics of relatively low orders. Modifications for this are minor, being principally to modify the frequencies of the reference signals. Assuming a 12-pulse converter such harmonics may be for example at orders 4, 5, 6 or 7. These are all non-characteristic harmonics generated by the converter 1, normally caused by some form of unbalance in the converter or its connected AC system. Characteristic harmonics, that is orders 11, 13, . . . 23, 25, . . . cannot however be filtered by control action.

The description above is for a feedback from a measured component in AC busbar 3 voltage (at $3^{rd}$ harmonic in the description). The measured signal, and hence the quantity attenuated by the auxiliary control system 17, may alternatively be a harmonic component in the converter 1 AC current, derived via current transformers. This is advantageous for the case where the AC system impedance is relatively low, and the AC system has a pre-existing e.m.f. component at the harmonic to be attenuated, because it avoids over-driving the converter main control system 11 and hence exaggerating distortion.

In the case where the block shown as 8 in FIG. 1 is a second converter, the invention may be applied to each of the two converters, using separate auxiliary control systems 17 and signal sources. For this case, if the two AC systems associated with the converters are of different frequencies, there may exist two 2nd harmonics in DC line current of correspondingly different frequencies, and hence two $3^{rd}$ harmonic components in each AC system, also of different frequencies. In each auxiliary control system 17 it may then be necessary to provide appropriate control system filters to prevent unwanted effects from the "remote" converter in each case.

It will be understood that each of the elements described above, or two or more together, also may find a useful application in other types of constructions differing from the types described above.

While the invention has been illustrated and described as embodied in a thyristor-type AC/DC converter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims:

We claim:

1. A thyristor-type AC/DC converter for connection to an AC power system, the converter comprising: a main control system for supplying firing pulses to a plurality of thyristors in the converter, and an auxiliary control system connected to the main control system through a summing junction for modifying a timing of the firing pulses from the main control system, thereby to suppress a non-characteristic $n^{th}$ harmonic component of a fundamental frequency in the AC power system caused by the operation of the AC/DC converter, the auxiliary control system being connected to receive a three-phase input signal representative of said harmonic component and deliver to the summing junction an output signal comprising a modulating $r^{th}$ harmonic signal, the auxiliary control system including a two-axis integral AC servo control.

2. The AC/DC converter according to claim 1, comprising a 6-pulse or 12-pulse converter.

3. The AC/DC converter according to claim 1, in which the non-characteristic $n^{th}$ harmonic component is the $3^{rd}$ harmonic and the modulating $r^{th}$ harmonic signal is the $2^{nd}$ harmonic.

4. The AC/DC converter according to claim 1, in which the auxiliary control system has an adjustable gain device for applying a gain to the output signal and an adjustable phase angle control device for applying a phase angle λ to the output signal.

5. The AC/DC converter according to claim 4, in which the auxiliary control system is provided with means for manually adjusting the adjustable gain device and the adjustable phase angle control device.

6. The AC/DC converter according to claim 4, in which the auxiliary control system is provided with means for automatically adjusting the adjustable gain device and the adjustable phase angle control device in dependence on DC electrical quantities in the converter.

7. The AC/DC converter according to claim 4, in which the auxiliary control system has an adjustable phase angle control device for applying a phase angle λ to the output signal via the co-ordinate transform means.

8. A method of automatically applying a phase angle λ to an output signal of an auxiliary control system of an AC/DC converter connected to an AC power system, the converter comprising: a main control system for supplying firing pulses to a plurality of thyristors in the converter, and the auxiliary control system being connected to the main control system through a summing junction for modifying a timing of the firing pulses from the main control system, thereby to suppress a non-characteristic $n^{th}$ harmonic component of a fundamental frequency in the AC power system caused by the operation of the AC/DC converter, the auxiliary control system being connected to receive a three-phase input signal representative of said harmonic component and deliver to the summing junction an output signal comprising a modulating $r^{th}$ harmonic signal, the auxiliary control system including:

a) a two-axis integral AC servo control, b) a three-phase to two-phase conversion means for converting the input signal to two signals containing both the fundamental frequency and the $n^{th}$ harmonic component, c) demodulating means for demodulating the two signals from the conversion means to produce two DC signals proportional respectively to direct axis and quadrature axis components of the $n^{th}$ harmonic component, d) co-ordinate transform means for phase rotation of the two DC signals from the demodulating means by a phase angle λ to produce phase rotated signals, e) integration means for integration of the phase rotated signals from the signal co-ordinate transform means to produce two integrated DC signal components, f) modulating means for modulating and combining the two integrated DC signal components from the signal integration means to form the $r^{th}$ harmonic output signal from the auxiliary control system, and g) an adjustable phase angle control device for applying the phase angle to the output signal via the co-ordinate transform means, the method comprising the step of:

h) adjusting the phase angle control device in accordance with a reciprocal of a measured complex value of total open loop gain of a network comprising the AC/DC converter, the main control system, and at least part of the auxiliary control system.

9. A method of automatically applying a phase angle λ to an output signal of an auxiliary control system of an AC/DC converter connected to an AC power system, the converter comprising: a main control system for supplying firing pulses to a plurality of thyristors in the converter, and the auxiliary control system being connected to the main control system through a summing junction for modifying a timing of the firing pulses from the main control system, thereby to suppress a non-characteristic $n^{th}$ harmonic component of a fundamental frequency in the AC power system caused by the operation of the AC/DC converter, the auxiliary control system being connected to receive a three-phase input signal representative of said harmonic component and deliver to the summing junction an output signal comprising a modulating $r^{th}$ harmonic signal, the auxiliary control system including, a) a two-axis integral AC servo control, b) a three-phase to two-phase conversion means for converting the input signal to two signals containing both the fundamental frequency and the $n^{th}$ harmonic component, c) demodulating means for demodulating the two signals from the conversion means to produce two DC signals proportional respectively to direct axis and quadrature axis components of the $n^{th}$ harmonic component, d) co-ordinate transform means for phase rotation of the two DC signals from the demodulating means by the phase angle $\lambda$ to produce phase rotated signals, e) integration means for integration of the phase rotated signals from the signal co-ordinate transform means to produce two integrated DC signal components, f) modulating means for modulating and combining the two integrated DC signal components from the signal integration means to form the $r^{th}$ harmonic output signal from the auxiliary control system, and g) an adjustable phase angle control device for applying the phase angle to the output signal via the co-ordinate transform means, the method comprising the steps of:

h) running the auxiliary control means in a closed-loop control mode, i) comparing the phases of the input and output signals of the auxiliary control system to derive a derived phase angle therefrom, and j) inputting the derived phase angle to the phase angle control device thereby to adjust the phase angle of the output signal.

10. The method of claim 9, in which the phase comparison and phase angle adjustment is initiated at first switch-on of said auxiliary control system.

11. The method of claim 9, in which the phase comparison and phase angle adjustment is initiated on detection of substantial disturbance during operation of the AC/DC converter.

12. A thyristor-type AC/DC converter for connection to an AC power system, the converter comprising: a main control system for supplying firing pulses to a plurality of thyristors in the converter, and an auxiliary control system connected to the main control system through a summing junction for modifying a timing of the firing pulses from the main control system, thereby to suppress a non-characteristic $n^{th}$ harmonic component of a fundamental frequency in the AC power system caused by the operation of the AC/DC converter, the auxiliary control system being connected to receive a three-phase input signal representative of said harmonic component and deliver to the summing junction an output signal comprising a modulating $r^{th}$ harmonic signal, the auxiliary control system including a two-axis integral AC servo control and in which the auxiliary control system comprises:

a) a three-phase to two-phase conversion means for converting the input signal to two signals containing both the fundamental frequency and the $n^{th}$ harmonic component, b) demodulating means for demodulating the two signals from the conversion means to produce two DC signals proportional respectively to direct axis and quadrature axis components of the $n^{th}$ harmonic component, p1 c) co-ordinate transform means for phase rotation of the two DC signals from the demodulating means by a phase angle $\lambda$ to produce phase rotated signals, d) integration means for integration of the phase rotated signals from the signal coordinate transform means to produce two integrated DC signal components, and e) modulating means for modulating and combining the two integrated DC signal components from the signal integration means to form the $r^{th}$ harmonic output signal from the auxiliary control system.

* * * * *